(12) United States Patent
Hasegawa et al.

(10) Patent No.: US 12,087,952 B2
(45) Date of Patent: Sep. 10, 2024

(54) MESOPOROUS CARBON, ELECTRODE CATALYST FOR FUEL CELL, CATALYST LAYER, FUEL CELL, AND METHOD FOR PRODUCING MESOPOROUS CARBON

(71) Applicant: TOYOTA JIDOSHA KABUSHIKI KAISHA, Toyota (JP)

(72) Inventors: Naoki Hasegawa, Nagakute (JP); Kazuhisa Yano, Nagakute (JP); Tomohiro Takeshita, Nagakute (JP); Rui Imoto, Fujisawa (JP); Kumiko Nomura, Okazaki (JP); Noriyuki Kitao, Susono (JP); Yunan Wang, Machida (JP); Yuuki Kasama, Yokkaichi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 80 days.

(21) Appl. No.: 17/656,797

(22) Filed: Mar. 28, 2022

(65) Prior Publication Data
US 2022/0320528 A1  Oct. 6, 2022

(30) Foreign Application Priority Data

Mar. 30, 2021 (JP) ................................. 2021-057848

(51) Int. Cl.
*H01M 4/92* (2006.01)
*H01M 4/86* (2006.01)
*H01M 4/88* (2006.01)

(52) U.S. Cl.
CPC ......... *H01M 4/926* (2013.01); *H01M 4/8605* (2013.01); *H01M 4/8892* (2013.01)

(58) Field of Classification Search
None
See application file for complete search history.

(56) References Cited

U.S. PATENT DOCUMENTS

2006/0166811 A1  7/2006  Huang et al.
2006/0263288 A1  11/2006  Pak et al.
(Continued)

FOREIGN PATENT DOCUMENTS

EP  3 392 938 A1  10/2018
JP  2003-036856 A  2/2003
(Continued)

OTHER PUBLICATIONS

KR20050116171A English translation (Year: 2005).*
WO2021161929A1 English translation (Year: 2021).*

*Primary Examiner* — Lucas J. O'Donnell
(74) *Attorney, Agent, or Firm* — Dickinson Wright, PLLC (57) ABSTRACT

Mesoporous carbon has a connecting structure in which primary particles made of carbon particles having primary pores with a primary pore diameter of less than 20 nm are connected. In the mesoporous carbon, the pore capacity of secondary pores with secondary pore diameters within a range of 20 nm to 100 nm, which is measured by a mercury intrusion method, is 0.42 cm$^3$/g or more and 1.34 cm$^3$/g or less. In addition, the mesoporous carbon has a linearity of 2.2 or more and 2.6 or less. An electrode catalyst for a fuel cell includes the mesoporous carbon and catalyst particles supported in the primary pores in the mesoporous carbon. Furthermore, a catalyst layer includes the electrode catalyst for the fuel cell and a catalyst layer ionomer.

7 Claims, 5 Drawing Sheets

(56) References Cited

U.S. PATENT DOCUMENTS

| | | |
|---|---|---|
| 2009/0098442 A1 | 4/2009 | Pak et al. |
| 2013/0245219 A1 | 9/2013 | Perry et al. |
| 2015/0352522 A1 | 12/2015 | Mizuuchi et al. |
| 2018/0123154 A1 | 5/2018 | Furukawa et al. |

FOREIGN PATENT DOCUMENTS

| | | | |
|---|---|---|---|
| JP | 2006-152249 A | 6/2006 | |
| JP | 2010-265125 A | 11/2010 | |
| JP | 2013-216811 A | 10/2013 | |
| JP | 2019-169317 A | 10/2019 | |
| JP | 2019-214505 A | 12/2019 | |
| JP | 2020-166941 A | 10/2020 | |
| KR | 1020050116171 A | 12/2005 | |
| WO | 2009/149540 A1 | 12/2009 | |
| WO | 2012/088166 A1 | 6/2012 | |
| WO | 2014/129597 A1 | 8/2014 | |
| WO | 2016/152447 A1 | 9/2016 | |
| WO | WO-2021161929 A1 * | 8/2021 | .......... H01M 4/8605 |

* cited by examiner

$$\text{LINEARITY} = \frac{L_{max}^2}{S} \times \frac{\pi}{4}$$

FIG. 2A

EXAMPLE 1

FIG. 2B

EXAMPLE 1

FIG. 3A

COMPARATIVE EXAMPLE 2

FIG. 3B

COMPARATIVE EXAMPLE 2

MESOPOROUS CARBON, ELECTRODE CATALYST FOR FUEL CELL, CATALYST LAYER, FUEL CELL, AND METHOD FOR PRODUCING MESOPOROUS CARBON

CROSS-REFERENCE TO RELATED APPLICATION

This application claims priority to Japanese Patent Application No. 2021-057848 filed on Mar. 30, 2021, incorporated herein by reference in its entirety.

BACKGROUND

1. Technical Field

The present disclosure relates to mesoporous carbon, an electrode catalyst for a fuel cell, a catalyst layer, a fuel cell, and a method for producing mesoporous carbon.

2. Description of Related Art

Polymer electrolyte fuel cells include a membrane electrode assembly (MEA) in which electrodes (catalyst layers) containing catalysts are joined to both surfaces of an electrolyte membrane. Gas diffusion layers are usually disposed outside the catalyst layers. Furthermore, current collectors (separators) each including a gas flow path are disposed outside the gas diffusion layers. Polymer electrolyte fuel cells usually have a structure (fuel cell stack) in which a plurality of single-cells including the MEA, the gas diffusion layers, and the current collectors is laminated.

In polymer electrolyte fuel cells, the catalyst layer is generally made of a mixture of an electrode catalyst containing catalyst metal fine particles, such as platinum, supported on a carrier surface and a catalyst layer ionomer. A carbon material, such as carbon black or acetylene black, is usually used as a catalyst carrier. Furthermore, it is known that the pore diameters, specific surface area, and the like of the carbon material that is used for the catalyst carrier have an influence on the characteristics of fuel cells. Therefore, a variety of proposals have been thus far made regarding carbon materials having controlled pore diameters, specific surface areas, and the like.

For example, WO 2016/152447 discloses a method for producing a carrier carbon material including (a) firing a mixture of gamma alumina particles and polyvinyl alcohol in an inert gas atmosphere to obtain an alumina-carbon composite, (b) dissolving and removing alumina in the alumina-carbon composite using sodium hydroxide to obtain a carbon material, and (c) pulverizing the obtained carbon material and activating the pulverized carbon material.

The same document describes (A) a fact that, inside the carrier carbon material obtained as described above, mesopores (catalyst-supported pores) with a radius of 2 nm or more and 5 nm or less and mesopores (gas diffusion pores) with a radius of 5 nm or more and 25 nm or less that communicate with the catalyst-supported pores are present, (B) a fact that, when catalyst metal fine particles having a radius of 1 nm to 3 nm are supported by such a carrier carbon material, the catalyst metal fine particles are supported in the catalyst-supported pores, (C) a fact that, when the carrier carbon material containing the catalyst metal fine particles supported in the catalyst-supported pores is used as an air electrode catalyst for a fuel cell, water molecules generated on the catalyst metal fine particles diffuse from the catalyst-supported pores through the gas diffusion pores to the outside of the carrier carbon material, and (D) a fact that this makes it possible to suppress flooding occurring inside the carrier carbon material.

In polymer electrolyte fuel cells, when the number of voids in the catalyst layer becomes too small, a flooding phenomenon is likely to occur, and sufficient IV performance may not be obtained depending on the operating conditions. In addition, when the electron conductivity of the catalyst layer decreases, an overvoltage is generated when electrons needed for a reaction are supplied. Therefore, for catalyst carriers that are used for catalyst layers, a filling property low enough to secure appropriate voids in the catalyst layer and high electron conductivity are demanded. Furthermore, in order to reduce the costs of polymer electrolyte fuel cells, it is also demanded to reduce the production cost of such a catalyst carrier.

WO 2016/152447 describes that, when a carrier carbon material having catalyst-supported pores with a radius of 2 nm to 5 nm and gas diffusion pores with a radius of 5 nm to 25 nm is used, it is possible to suppress flooding that occurs inside the carrier carbon material. However, it is considered that, in the carrier carbon material described in the same document, it is difficult to form an appropriate catalyst layer structure (a composite structure, such as an appropriate thickness of the catalyst layer, an appropriate void structure, and the like) that makes it difficult for the flooding phenomenon to occur in high-current density ranges.

SUMMARY

One aspect of the present disclosure provides mesoporous carbon having excellent flooding resistance in high-current density ranges. In addition, one aspect of the present disclosure provides mesoporous carbon having not only excellent flooding resistance but also a small voltage drop attributed to overvoltage. Additionally, another aspect of the present disclosure provides an electrode catalyst for a fuel cell in which such mesoporous carbon is used as a catalyst carrier. Furthermore, still another aspect of the present disclosure provides a catalyst layer containing such an electrode catalyst for a fuel cell, a fuel cell, and a method for producing mesoporous carbon.

One aspect of the disclosure relates to mesoporous carbon. The mesoporous carbon has a connecting structure in which primary particles made of carbon particles having primary pores with a primary pore diameter of less than 20 nm are connected. In the mesoporous carbon, the pore capacity of secondary pores with secondary pore diameters within a range of 20 nm to 100 nm, which is measured by a mercury intrusion method, is 0.42 cm$^3$/g or more and 1.34 cm$^3$/g or less. The mesoporous carbon has a linearity of 2.2 or more and 2.6 or less.

In the mesoporous carbon according to the above aspect, an average particle diameter of the primary particles may be 30 nm or more and 300 nm or less.

In the mesoporous carbon according to the above aspect, the pore capacity of the secondary pores may be 0.42 cm$^3$/g or more and 1.00 cm$^3$/g or less.

Another aspect of the disclosure relates to an electrode catalyst for a fuel cell. The electrode catalyst contains the mesoporous carbon according to the above aspect of the present disclosure, and catalyst particles supported in the primary pores of the mesoporous carbon.

Furthermore, still another aspect of the disclosure relates to a catalyst layer. The catalyst layer includes the electrode catalyst for the fuel cell according to another aspect of the present disclosure, and a catalyst layer ionomer.

In the catalyst layer according to the above aspect, the catalyst layer may be an air electrode catalyst layer of the fuel cell.

Furthermore, regarding the fuel cell, a catalyst layer according to still another aspect of the present disclosure is provided.

Even still another aspect of the disclosure relates to a method for producing mesoporous carbon. The method includes a first step of preparing mesoporous silica that is a template, a second step of precipitating carbon in mesopores of the mesoporous silica to produce a mesoporous silica and carbon complex, and a third step of removing the mesoporous silica from the complex.

The method according to the above aspect may further include a fourth step of thermally treating the mesoporous carbon at a temperature higher than 1500° C. after the third step.

In the method according to the above aspect, the first step may include: a polymerizing step of performing condensation polymerization of a silica source in a reaction solution containing the silica source, a surfactant, and a catalyst to obtain precursor particles, a drying step of separating the precursor particles from the reaction solution and drying the precursor particles, and a firing step of firing the precursor particles to obtain mesoporous silica.

In the method according to the above aspect, the first step may further include a diameter expansion step of performing a diameter expansion treatment on the dried precursor particles.

When an electrode catalyst is produced using the mesoporous carbon according to one aspect of the present disclosure as a catalyst carrier, and a polymer electrolyte fuel cell is produced using this electrode catalyst as an air electrode catalyst, IV performance equivalent to or more favorable than IV performance of the related art can be obtained particularly in high-current density ranges. This is considered to be because, when mesoporous carbon in which a connecting structure is formed and the pore diameters, the pore capacity, and the linearity are optimized is used as a catalyst carrier, an air electrode catalyst layer having an appropriate thickness and an appropriate amount of voids is obtained, and this suppresses flooding. Furthermore, when the mesoporous carbon is thermally treated at a temperature of higher than 1500° C., the IV performance of fuel cells for which this mesoporous carbon has been used further improves. This is considered to be because the graphitization of the mesoporous carbon proceeds due to the thermal treatment at higher than 1500° C. and the electron conductivity of the mesoporous carbon improves.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described in detail.

1. Mesoporous Carbon

Figure 1A:
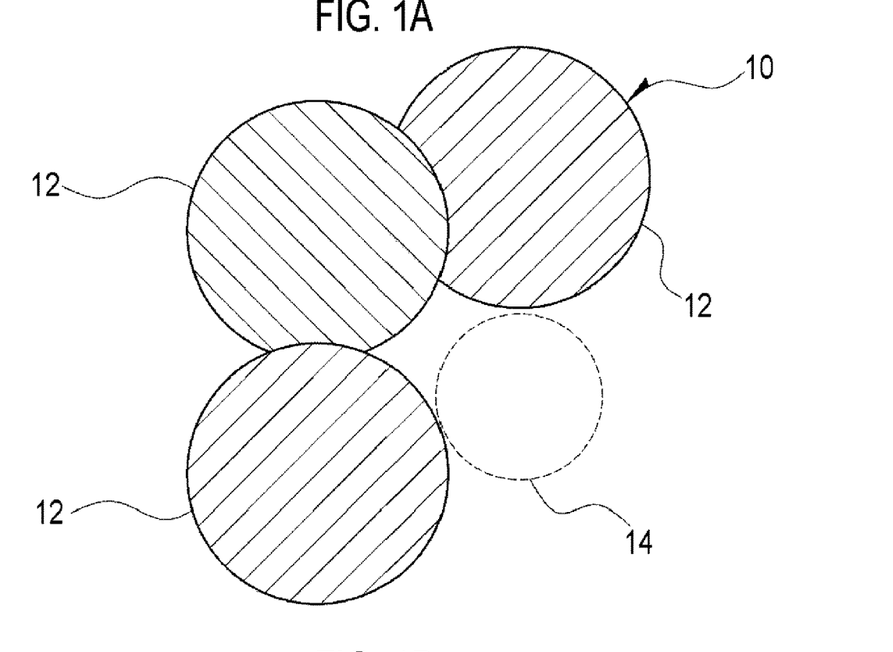
FIG. 1A is a schematic view of mesoporous carbon according to one aspect of the present disclosure.

FIG. 1A shows a schematic view of mesoporous carbon according to one aspect of the present disclosure. In FIG. 1A, mesoporous carbon 10 has a connecting structure in which primary particles 12 made of carbon particles having primary pores (not shown) are connected. Therefore, the mesoporous carbon 10 is not spherical particles and has a distorted shape. The degree of deviation of the shape of the mesoporous carbon 10 from a spherical shape can be expressed by linearity. The details of the linearity will be described below. When the mesoporous carbons 10 are deposited in layers, secondary pores 14 having a predetermined secondary pore diameter are formed between the mesoporous carbons 10 adjacent to each other.

1.1. Connecting Structure

As described below, the mesoporous carbon 10 is produced using mesoporous silica as a template. Mesoporous silica is usually synthesized by the condensation polymerization of a silica source in a reaction solution containing the silica source, a surfactant, and a catalyst. At this time, when the type of a solvent, the concentration of the surfactant and/or the concentration of the silica source in the reaction solution are optimized, mesoporous silica having a connecting structure and having pore diameters, pore capacity, and linearity within specific ranges can be obtained. Furthermore, when such mesoporous silica is used as a template, the mesoporous carbon 10 having a connecting structure and having pore diameters, pore capacity, and linearity within specific ranges can be obtained.

Figure 1B:
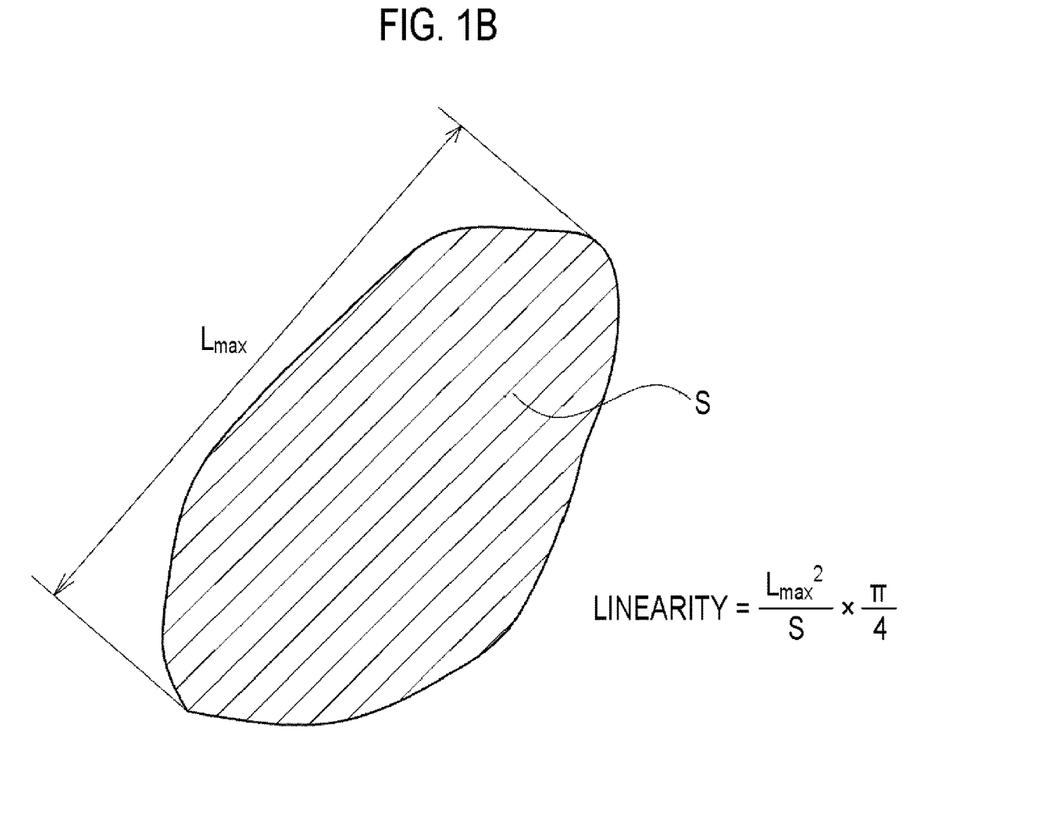
FIG. 1B is a schematic view for describing the definition of linearity.

Here, "connecting structure" refers to a structure in which primary particles 12 made of carbon particles are connected in a beaded shape. Each of the primary particles 12 constituting the connecting structure has a primary pore (not shown) inside the primary particle 12. The primary pore in the primary particle 12 is a cavity remaining after the pore wall of the mesoporous silica used as the template is removed. In FIGS. 1A and 1B, each of the primary particles 12 is drawn in a spherical shape, which is merely an example. The shape of the primary particle 12 is usually not a completely spherical shape and is a distorted shape with an aspect ratio of approximately 1.1 to 3.

1.2 Primary Particle

The primary particle 12 is made of a carbon particle having a primary pore with a primary pore diameter of less than 20 nm. Since the mesoporous carbon 10 is produced using a method described below, the primary particles 12 configuring the mesoporous carbon 10 have the following characteristics.

1.2.1. Average Particle Diameter of Primary Particles

The "average particle diameter of the primary particles 12" refers to the average value of the lengths of the primary particles 12 in the minor axis direction. The "length in the minor axis direction" refers to a length in a direction (major axis direction) perpendicular to a direction in which the length of the primary particle 12 is longest. The average particle diameter of the primary particles 12 can be obtained by measuring the lengths in the minor axis direction of 100 or more randomly selected primary particles 12 using a microscope and calculating the average value.

In general, when the average particle diameter of the primary particles 12 becomes too small, it becomes difficult for catalyst particles to be supported in the primary pores. Therefore, the average particle diameter of the primary particles 12 is preferably 30 nm or more. The average particle diameter is preferably 40 nm or more, and more preferably 50 nm or more.

On the other hand, when the average particle diameter of the primary particles 12 becomes too large, it becomes difficult for a reaction gas or a proton to be supplied to the catalyst particles supported in the primary pores or it becomes difficult for water generated by a reaction to be discharged. Therefore, the average particle diameter is preferably 300 nm or less. The average particle diameter is preferably 250 nm or less and more preferably 150 nm or less.

1.2.2 Primary Pore Diameter

The "primary pore diameter" refers to the average value of the diameters of the primary pores that are included in the primary particles 12, but does not include the size of a void (secondary pore 14) between the primary particles 12. The primary pore diameter can be obtained by analyzing the adsorption side data of the nitrogen adsorption isotherm of the mesoporous carbon 10 by a BJH method and obtaining the pore diameter (most frequent peak value) when the pore capacity is maximized.

In general, when the primary pore diameter becomes too small, it becomes difficult for the reaction gas or a proton to be supplied to the catalyst particles supported in the primary pores or it becomes difficult for water generated by a reaction to be discharged. Therefore, the primary pore diameter is preferably 2 nm or more. The primary pore diameter is preferably 2.5 nm or more. On the other hand, when the primary pore diameter becomes too large, an ionomer is likely to invade the primary pores. As a result, the catalyst particles are poisoned by the ionomer, and the activity decreases. Therefore, the primary pore diameter needs to be less than 20 nm. The primary pore diameter is preferably 10 nm or less, more preferably 7 nm or less, and still more preferably 5 nm or less.

1.2.3. Average Thickness of Pore Wall

The "average thickness of the pore wall" refers to the average value of the thicknesses of the pore walls of the primary pores that are included in the primary particles 12. The average thickness of the pore walls can be obtained by measuring the thicknesses of 100 or more randomly selected pore walls using a microscope and calculating the average value.

When the average thickness of the pore walls is too thin, the carbon is easily oxidized and the durability may deteriorate. Therefore, the average thickness of the pore walls is preferably 3 nm or more. The average thickness is preferably 3.5 nm or more and more preferably 4 nm or more. On the other hand, when the average thickness of the pore walls becomes too thick, the pore capacity of the primary particles 12 becomes small, and it may be difficult for the catalyst particles to be supported. Therefore, the average thickness of the pore walls is preferably 15 nm or less. The average thickness is preferably 12 nm or less and more preferably 10 nm or less.

1.2.4. Pore Capacity of Primary Pores

The "pore capacity of the primary pores" refers to the volume of the primary pores that are included in the primary particles 12 and does not include the volume of the voids (secondary pores 14) between the primary particles 12. The pore capacity of the primary pores can be obtained by the analysis of the adsorption data of the nitrogen adsorption isotherm of the mesoporous carbon 10 by the BJH method and calculation at the values of $P/P_0=0.03$ to 0.99.

In general, when the pore capacity of the primary pores becomes too small, it becomes difficult for the catalyst particles to be supported. Therefore, the pore capacity of the primary pores is preferably 0.2 mL/g or more. The pore capacity of the primary pores is preferably 0.5 mL/g or more and more preferably 1.0 mL/g or more. On the other hand, when the pore capacity of the primary pores becomes too large, the ratio of the volume of the pore walls to the volume of the primary particles 12 becomes small, and the electron conductivity may become low. In addition, the amount of the ionomer invading increases, and the activity may decrease due to catalyst poisoning. Therefore, the pore capacity of the primary pores is preferably 3.0 mL/g or less. The pore capacity of the primary pores is preferably 2.5 mL/g or less and more preferably 2.0 mL/g or less.

1.3. Pore Capacity of Secondary Pores

The "secondary pore" refers to a pore between the mesoporous carbons 10 adjacent to each other when the mesoporous carbons 10 are deposited in layers. The "secondary pore diameter" refers to the diameter of the secondary pore 14 measured by a mercury intrusion method. The "pore capacity of the secondary pore" refers to the volume of the secondary pore 14 measured by the mercury intrusion method.

When the pore capacity of the mesoporous carbon 10 is measured by the mercury intrusion method, the secondary pores 14 having a secondary pore diameter of more than 100 nm may also be detected. However, it is mainly the secondary pores 14 having a secondary pore diameter in a range of 20 nm to 100 nm that affect flooding in the high-current density range.

When the pore capacity of the secondary pores 14 having a secondary pore diameter in a range of 20 nm to 100 nm (hereinafter, also referred to as "pore capacity @ 20 nm to 100 nm") in the pore capacity of the secondary pores 14 become too small, the flooding resistance in the high-current density range deteriorates. Therefore, the pore capacity @ 20 nm to 100 nm needs to be 0.42 cm$^3$/g or more. The pore capacity @ 20 nm to 100 nm is preferably 0.50 cm$^3$/g or more and more preferably 0.70 cm³/g or more. On the other hand, when the pore capacity @ 20 nm to 100 nm becomes too large, the thickness of a catalyst layer may increase and the proton transport resistance may increase. Therefore, the pore capacity @ 20 nm to 100 nm needs to be 1.34 cm³/g or less. The pore capacity @ 20 nm to 100 nm is preferably 1.32 cm³/g or less, more preferably 1.30 cm³/g or less, and still more preferably 1.00 cm³/g or less.

1.4. Linearity

FIG. 1B shows a schematic view for describing the definition of linearity. The "linearity" refers to a value represented by the following equation (1).

$$\text{Linearity} = (L_{max}^2/S) \times (\pi/4) \quad (1)$$

Here, $L_{max}$ is the length in a direction in which the particle length is maximized (the length in the major axis direction), and S is the area of a projection plane of the particle.

The linearity represents the degree of deviation of the particle shape from a spherical shape and becomes a value closer to one as the shape of the projection plane of the particle is closer to a circle. The magnitude of the linearity of the mesoporous carbon 10 affects the secondary pore diameter and pore capacity of the secondary pore 14. In general, when the linearity becomes too small, the secondary pore diameter and/or pore capacity of the secondary pore 14 becomes excessively small, and the flooding resistance in the high-current density range deteriorates. Therefore, the linearity needs to be 2.2 or more.

On the other hand, in order to obtain a high output in polymer electrolyte fuel cells, the catalyst basis weight (the amount of catalyst particles per unit area) needs to be set to a certain threshold value or more. However, when the linearity of the mesoporous carbon 10 is excessively large, the thickness of the catalyst layer needs to be increased in order to make the catalyst basis weight equal to or more than the threshold value. As a result, the proton conductivity of the catalyst layer may decrease. Therefore, the linearity needs to be 2.6 or less. The linearity is preferably 2.5 or less and more preferably 2.4 or less.

1.5. Degree of Graphitization

The mesoporous carbon can be obtained by filling the mesopores in the mesoporous silica with a carbon source and carbonizing the carbon source. However, in order to suppress a reaction between the mesoporous silica and carbon, the carbonization temperature of the carbon source needs to be set to be relatively low. Therefore, the mesoporous carbon after carbonization of the carbon source is likely to form a turbostratic structure. The mesoporous carbon having a turbostratic structure has low electron conductivity compared with mesoporous carbon having a graphite structure.

In contrast, when the mesoporous carbon having a turbostratic structure is subjected to a graphitization treatment at a temperature of higher than 1500° C., the mesoporous carbon having a turbostratic structure gradually changes to a graphite structure. In general, as the graphitization treatment temperature increases, the degree of graphitization improves.

2. Electrode Catalyst for Fuel Cell

An electrode catalyst for a fuel cell according to another aspect of the present disclosure contains mesoporous carbon and catalyst particles supported in primary pores in the mesoporous carbon.

2.1. Mesoporous Carbon

In the electrode catalyst for a fuel cell, the mesoporous carbon is a catalyst carrier for supporting catalyst particles. The catalyst particles are mainly supported in the primary pores in the primary particles 12 configuring the mesoporous carbon. The details of the mesoporous carbon are as described above and will not be described again.

2.2. Catalyst Particles

In the present disclosure, the material of the catalyst particles is not particularly limited as long as the material exhibits oxygen reduction reaction activity or hydrogen oxidation reaction activity. Examples of the material of the catalyst particles include
 (a) noble metals (Pt, Au, Ag, Pd, Rh, Ir, Ru, and Os),
 (b) alloys containing two or more noble metal elements,
 (c) alloys containing one or more noble metal elements and one or more base metal elements (for example, Fe, Co, Ni, Cr, V, Ti, and the like),
 (d) metallic oxynitride,
 (e) carbon alloys, and
 the like.

3. Catalyst Layer

A catalyst layer according to another aspect of the present disclosure contains an electrode catalyst for a fuel cell and a catalyst layer ionomer.

The catalyst layer is particularly suitable as a catalyst layer on the air electrode side, but may also be used as a catalyst layer on the fuel electrode side.

3.1. Electrode Catalyst for Fuel Cell

The catalyst layer contains an electrode catalyst for a fuel cell. The details of the electrode catalyst for the fuel cell are as described above and will not be described again.

3.2. Catalyst Layer Ionomer

In the catalyst layer, the material of the catalyst layer ionomer is not particularly limited. Examples of the catalyst layer ionomer include a perfluorocarbon sulfonic acid polymer, a highly oxygen-permeable ionomer, and the like. The ionomer may be any one of these or two or more thereof may be used in combination.

The "perfluorocarbon sulfonic acid polymer" refers to a fluorine-containing ion exchange resin including a repeating unit based on a fluorinated sulfonyl vinyl ether monomer. Examples of the perfluorocarbon sulfonic acid polymer include NAFION (registered trademark), FLEMION (registered trademark), AQUIVION (registered trademark), ACIPLEX (registered trademark), and the like.

The "highly oxygen-permeable ionomer" refers to a polymer compound including an acid group and a cyclic structure in the molecular structure. The highly oxygen-permeable ionomer includes a cyclic structure in the molecular structure and has a high oxygen permeability coefficient.

Therefore, when the highly oxygen-permeable ionomer is used as an ionomer, the oxygen transfer resistance at the interface with the catalyst becomes relatively small. In other words, the "highly oxygen-permeable ionomer" refers to an ionomer having a higher oxygen permeability coefficient than perfluorocarbon sulfonic acid polymers represented by NAFION (registered trademark).

Examples of the highly oxygen-permeable ionomer include (a) an electrolyte polymer including a perfluorocarbon unit having an aliphatic ring structure and an acid group unit having perfluorosulfonic acid in a side chain, (b) an electrolyte polymer including a perfluorocarbon unit having an aliphatic ring structure and an acid group unit having a perfluoroimide in a side chain, (c) an electrolyte polymer including a unit in which perfluorosulfonic acid is directly bonded to perfluorocarbon having an aliphatic ring structure, and the like (refer to Japanese Unexamined Patent Application Publication No. 2003-036856 (JP 2003-036856 A), WO 2012/088166, Japanese Unexamined Patent Application Publication No. 2013-216811 (JP 2013-216811 A), and Japanese Unexamined Patent Application Publication No. 2006-152249 (JP 2006-152249 A)).

4. Method for Producing Mesoporous Silica (Template)

The mesoporous carbon according to one aspect of the present disclosure is produced using mesoporous silica as a template. The method for producing mesoporous silica includes a polymerizing step of performing condensation polymerization of a silica source in a reaction solution containing the silica source, a surfactant, and a catalyst to obtain precursor particles, a drying step of separating the precursor particles from the reaction solution and drying the precursor particles, and a firing step of firing the precursor particles to obtain mesoporous silica.

The method for producing mesoporous silica may further include a diameter expansion step of performing a diameter expansion treatment on the dried precursor particles.

4.1. Polymerizing Step

First, the condensation polymerization of a silica source is performed in a reaction solution containing the silica source, a surfactant, and a catalyst to obtain precursor particles (polymerizing step).

4.1.1. Silica Source

In the present disclosure, the type of the silica source is not particularly limited. Examples of the silica source include (a) tetraalkoxysilanes, such as tetramethoxysilane, tetraethoxysilane, tetraisopropoxysilane, tetrabutoxysilane, dimethoxydiethoxysilane, and tetraethyleneglycoxysilane, (b) trialkoxysilanes, such as 3-mercaptopropyltrimethoxysilane, 3-aminopropyltrimethoxysilane, 3-aminopropyltriethoxysilane, and 3-(2-aminoethyl) aminopropyltrimethoxysilane, and (c) silicates, such as sodium silicate and kanemite, and the like. As the silica source, any one of these may be used or two or more thereof may be used in combination.

4.1.2. Surfactant

When the condensation polymerization of the silica source is performed in the reaction solution, in a case where a surfactant is added to the reaction solution, the surfactant forms a micelle in the reaction solution. Since hydrophilic groups gather around the micelle, the silica source is adsorbed to the surface of the micelle. Furthermore, the micelle to which the silica source is adsorbed self-organizes in the reaction solution, and condensation polymerization of the silica source is performed. As a result, inside the primary particle, a mesopore (including a micropore having a diameter of 2 nm or less, which will be also true below) attributed to the micelle is formed. The size of the mesopore can be controlled (to be 1 nm to 50 nm) mainly by the molecular length of the surfactant.

In the present disclosure, the type of the surfactant is not particularly limited, but an alkyl quaternary ammonium salt is preferably used as the surfactant. The alkyl quaternary ammonium salt refers to a compound represented by the following formula (a).

$$CH_3\text{—}(CH_2)_n\text{—}N^+(R_1)(R_2)(R_3)X^- \quad (a)$$

In the formula (a), $R_1$, $R_2$, and $R_3$ each represent an alkyl group having 1 to 3 carbon atoms. $R_1$, $R_2$, and $R_3$ may be the same as or different from each other. In order to facilitate the aggregation of the alkyl quaternary ammonium salts (formation of the micelle), $R_1$, $R_2$, and $R_3$ are preferably all the same. Furthermore, at least one of $R_1$, $R_2$, and $R_3$ is preferably a methyl group, and all of them are preferably methyl groups. In the formula (a), X represents a halogen atom. The type of halogen atom is not particularly limited, but X is preferably Cl or Br from the viewpoint of easy procurement.

In the formula (a), n represents an integer of 7 to 21. In general, as n becomes smaller, a spherical mesoporous body including a mesopore with a smaller central pore diameter is obtained. On the other hand, as n becomes larger, the central pore diameter becomes larger; however, when n becomes too large, the hydrophobic interaction of the alkyl quaternary ammonium salt becomes excessive. As a result, a layered compound is generated, and a mesoporous body cannot be obtained. n is preferably 9 to 17 and more preferably 13 to 17.

Among the compounds represented by the formula (a), alkyltrimethylammonium halide is preferable. Examples of the alkyltrimethylammonium halide include hexadecyltrimethylammonium halide, octadecyltrimethylammonium halide, nonyltrimethylammonium halide, decyltrimethylammonium halide, undecyltrimethylammonium halide, dodecyltrimethylammonium halide, tetradecylammonium halide, and the like. Among these, alkyltrimethylammonium bromide or alkyltrimethylammonium chloride is particularly preferable.

When mesoporous silica is synthesized, one type of alkyl quaternary ammonium salt may be used or two or more types may be used. However, since the alkyl quaternary ammonium salt serves as a template for forming mesopores in the primary particles, the type of the alkyl quaternary ammonium salt has a significant influence on the shapes of the mesopores. In order to synthesize silica particles having more uniform mesopores, one type of alkyl quaternary ammonium salt is preferably used.

4.1.3. Catalyst

When the condensation polymerization of the silica source is performed, a catalyst is usually added to the reaction solution. When particulate mesoporous silica is synthesized, as the catalyst, an alkali, such as sodium hydroxide or aqueous ammonia, may be used or an acid, such as hydrochloric acid, may be used.

4.1.4. Solvent

As a solvent, water, an organic solvent, such as an alcohol, a mixed solvent of water and an organic solvent, or the like is used. The alcohol may be any of
(1) a monovalent alcohol, such as methanol, ethanol, or propanol,
(2) a divalent alcohol, such as ethylene glycol, and
(3) a trivalent alcohol, such as glycerin.

When the mixed solvent of water and an organic solvent is used, the content of the organic solvent in the mixed solvent can be arbitrarily selected depending on the intended purpose. In general, when an appropriate amount of an organic solvent is added to the solvent, the control of particle diameters or the particle size distribution becomes easy. Furthermore, when the mixed solvent of water and an organic solvent is used, in a case where a mixed solvent in which the content of the organic solvent is 5 mass % or less is used, it is possible to produce, at low costs, mesoporous silica for producing mesoporous carbon having excellent flooding resistance.

4.1.5. Composition of Reaction Solution

The composition of the reaction solution affects the outer shape and pore structure of mesoporous silica to be synthesized. In particular, the concentration of the surfactant and the concentration of the silica source in the reaction solution have a significant influence on the average particle diameter of the primary particles, the pore diameters, the pore capacity, and the linearity of the mesoporous silica particles.

A. Concentration of Surfactant

When the concentration of the surfactant is too low, a precipitation rate of the particles becomes slow, and a structure in which the primary particles are connected cannot be obtained. Therefore, the concentration of the surfactant needs to be 0.03 mol/L or more. The concentration of the surfactant is preferably 0.035 mol/L or more and more preferably 0.04 mol/L or more.

On the other hand, when the concentration of the surfactant is too high, the precipitation rate of the particles becomes too fast, and primary particle diameters easily exceed 300 nm. Therefore, the concentration of the surfactant needs to be 1.0 mol/L or less. The concentration of the surfactant is preferably 0.95 mol/L or less and more preferably 0.90 mol/L or less.

B. Concentration of Silica Source

When the concentration of the silica source is too low, the precipitation rate of the particles becomes slow, and a structure in which the primary particles are connected cannot be obtained. Alternatively, the surfactant becomes excessive, and uniform mesopores may not be obtained. Therefore, the concentration of the silica source needs to be 0.05 mol/L or more. The concentration of the silica source is preferably 0.06 mol/L or more and more preferably 0.07 mol/L or more.

On the other hand, when the concentration of the silica source is too high, the precipitation rate of the particles becomes too fast, and the primary particle diameters easily exceed 300 nm. Alternatively, sheet-like particles may be obtained instead of spherical particles. Therefore, the concentration of the silica source needs to be 1.0 mol/L or less. The concentration of the silica source is preferably 0.95 mol/L or less and more preferably 0.9 mol/L or less.

C. Concentration of Catalyst

In the present disclosure, the concentration of the catalyst is not particularly limited. In general, when the concentration of the catalyst is too low, the precipitation rate of the particles becomes slow. On the other hand, when the concentration of the catalyst is too high, the precipitation rate of the particles becomes fast. As an optimum concentration of the catalyst, the optimum concentration is preferably selected depending on the type of the silica source, the type of the surfactant, intended physical property values, and the like. For example, when an acid is used as the catalyst, the concentration of the catalyst is preferably adjusted such that the pH of the reaction solution becomes 9 or less. The pH of the reaction solution is preferably 8.5 or less and more preferably less than 5. On the other hand, when an alkali is used as the catalyst, the concentration of the catalyst is preferably adjusted such that the pH of the reaction solution exceeds 7.

4.1.6 Reaction Conditions

The silica source is added to the solvent containing a predetermined amount of the surfactant, and hydrolysis and condensation polymerization are performed. Therefore, the surfactant functions as a template, and precursor particles containing silica and the surfactant are obtained. As the reaction conditions, optimum reaction conditions are selected depending on the type of the silica source, the particle diameters of the precursor particles, and the like. In general, the reaction temperature is preferably −20° C. to 100° C. The reaction temperature is preferably 0° C. to 100° C., more preferably 0° C. to 90° C., still more preferably 10° C. to 80° C., and far still more preferably 35° C. to 80° C.

4.2. Drying Step

Next, the precursor particles are separated from the reaction solution and dried (drying step). The precursor particles are dried to remove the solvent remaining in the precursor particles. Drying conditions are not particularly limited as long as the solvent can be removed.

4.3. Diameter Expansion Treatment

Next, a diameter expansion treatment may be performed on the dried precursor particles as needed (diameter expansion step). The "diameter expansion treatment" refers to a treatment for expanding the diameters of the mesopores in the primary particles. Specifically, the diameter expansion treatment is performed by hydrothermally treating the synthesized precursor particles (the precursor particles from which the surfactant is not removed) in a solution containing a diameter-expanding agent. This treatment makes it possible to expand the pore diameters in the precursor particles.

Examples of the diameter-expanding agent include
(a) hydrocarbons, such as trimethylbenzene, triethylbenzene, benzene, cyclohexane, triisopropylbenzene, naphthalene, hexane, heptane, octane, nonane, decane, undecane, and dodecane,
(b) acids, such as hydrochloric acid, sulfuric acid, and nitric acid, and
the like.

It is considered that the hydrothermal treatment under coexistence with a hydrocarbon expands the pore diameters since silica is rearranged when the diameter-expanding agent is introduced from the solvent into pores of the more hydrophobic precursor particles. In addition, it is considered that the hydrothermal treatment under coexistence with an acid, such as hydrochloric acid, expands the pore diameters since the dissolution and reprecipitation of silica proceed inside the primary particles. When the production conditions are optimized, radial pores are formed inside the silica. When these pores are hydrothermally treated under coexistence with an acid, the dissolution and reprecipitation of silica occur, and the radial pores are converted into communicating pores.

The conditions for the diameter expansion treatment are not particularly limited as long as intended pore diameters can be obtained. Usually, it is preferable to add approximately 0.05 mol/L to 10 mol/L of the diameter-expanding agent to the reaction solution and perform the hydrothermal treatment at 60° C. to 150° C.

4.4. Firing Step

Next, after the diameter expansion treatment is performed as needed, the precursor particles are fired (firing step). Therefore, mesoporous silica is obtained. The precursor particles are fired in order to dehydrate and polymerize the precursor particles in which a OH group remains and to thermally decompose the surfactant remaining in the mesopores. The firing conditions are not particularly limited as long as dehydration, crystallization, and the thermal decomposition of the surfactant are possible. The firing is usually performed by heating the precursor particles in the atmosphere at 400° C. to 800° C. for 1 hour to 10 hours.

5. Method for Producing Mesoporous Carbon

A method for producing mesoporous carbon according to a sixth aspect of the present disclosure includes
a first step of preparing mesoporous silica that serves as a template,
a second step of precipitating carbon in mesopores of the mesoporous silica to produce a mesoporous silica and carbon complex, and
a third step of removing the mesoporous silica from the complex.

The method for producing mesoporous carbon may further include, after the third step, a fourth step of thermally treating the mesoporous carbon at a temperature higher than 1500° C.

5.1. First Step (Production of Template)

First, mesoporous silica that serves as a template is produced (first step). The details of a method for producing the mesoporous silica are as described above and will not be described again.

5.2. Second Step (Precipitation of Carbon in Mesopores)

Next, carbon is precipitated in the mesopores in the mesoporous silica to produce a mesoporous silica and carbon complex (second step).

Specifically, carbon is precipitated in mesopores by
(a) introducing a carbon precursor into the mesopores and
(b) polymerizing and carbonizing the carbon precursor in the mesopores.

5.2.1. Introduction of Carbon Precursor

The "carbon precursor" refers to a substance capable of generating carbon by thermal decomposition. Specific examples of such a carbon precursor include (1) a polymer precursor that is liquid at normal temperature and is thermally polymerizable (for example, furfuryl alcohol, aniline, or the like),
(2) a mixture of an aqueous solution of a carbohydrate and an acid (for example, a mixture of a monosaccharide, such as sucrose (sucrose), xylose (wood sugar), or glucose (dextrose), a disaccharide, or a polysaccharide, and an acid, such as sulfuric acid, hydrochloric acid, nitric acid, or phosphoric acid),
(3) a mixture of two-component curable polymer precursors (for example, phenol and formalin, or the like), and the like.

Among these, the polymer precursor can be infused into the mesopores without being diluted with a solvent and is thus capable of generating a relatively large amount of carbon in the mesopores with a relatively small number of times of infusion. In addition, the polymer precursor has an advantage in that no polymerization initiator is needed and handling is also easy.

When a liquid or solution-form carbon precursor is used, the amount of the liquid or solution adsorbed per time is preferably as large as possible and is preferably an amount large enough to fill all of the mesopores with the liquid or solution. In addition, when the mixture of an aqueous solution of carbohydrate and an acid is used as the carbon precursor, the amount of the acid is preferably set to a minimum amount large enough to polymerize organic substances. Furthermore, when the mixture of two-component curable polymer precursors is used as the carbon precursor, as the ratio therebetween, an optimum ratio is selected depending on the type of the polymer precursor.

5.2.2. Polymerization and Carbonization of Carbon Precursor

Next, the polymerized carbon precursor is carbonized in the mesopores. The carbon precursor is carbonized by heating the mesoporous silica containing the carbon precursor to a predetermined temperature in a non-oxidizing atmosphere (for example, in an inert atmosphere, in a vacuum, or the like). Specifically, the heating temperature is preferably 500° C. or higher and 1200° C. or lower. When the heating temperature is lower than 500° C., the carbon precursor is not sufficiently carbonized. On the other hand, when the heating temperature exceeds 1200° C., silica and carbon react with each other, which is not preferable. As the heating time, an optimum heating time is selected depending on the heating temperature.

The amount of carbon generated in the mesopores needs to be equal to or larger than an amount large enough for carbon particles to maintain the shapes when the mesoporous silica has been removed. Therefore, when the amount of carbon produced by one round of filling, polymerization, and carbonization is relatively small, these steps are preferably repeated a plurality of times. In this case, the conditions for each of the steps to be repeated may be the same as or different from each other. In addition, when each step of filling, polymerization and carbonization is repeated a plurality of times, in each carbonization step, a carbonization treatment may be performed at a relatively low temperature, and, after the end of the final carbonization treatment, a carbonization treatment may be performed again at a higher temperature than the previous temperature. When the final carbonization treatment is performed at a higher temperature than that of the previous carbonization treatment, it becomes easy to integrate carbon introduced into the pores a plurality of times.

5.3. Third Step (Removal of Template)

Next, the mesoporous silica, which is a template, is removed from the complex (third step). As a result, mesoporous carbon is obtained.

Specific examples of a method for removing the mesoporous silica include (1) a method of heating the complex in an alkaline aqueous solution, such as sodium hydroxide, (2) a method of etching the complex with a hydrofluoric acid aqueous solution, and the like.

5.4. Fourth Step (Graphitization Treatment)

Next, the mesoporous carbon is thermally treated at a temperature higher than 1500° C. as needed (fourth step). When the carbon source is carbonized in the mesopores in the mesoporous silica, the thermal treatment temperature needs to be lowered in order to suppress a reaction between silica and carbon. Therefore, the degree of graphitization of carbon after the carbonization treatment is low. In order to obtain a high degree of graphitization, the mesoporous carbon is preferably thermally treated at a high temperature after the template is removed.

When the thermal treatment temperature is too low, graphitization becomes insufficient. Therefore, the thermal treatment temperature is preferably higher than 1500° C. The thermal treatment temperature is preferably 1700° C. or higher and more preferably 1800° C. or higher. On the other hand, even when the thermal treatment temperature is set to be higher than needed, there is no difference in effect, and there is no benefit. Therefore, the thermal treatment temperature is preferably 2300° C. or lower. The thermal treatment temperature is preferably 2200° C. or lower.

6. Action

In polymer electrolyte fuel cells, when the number of voids in the catalyst layer becomes too small, a flooding phenomenon is likely to occur, and sufficient IV performance may not be obtained depending on the operating conditions. In addition, when the electron conductivity of the catalyst layer decreases, an overvoltage is generated when electrons needed for a reaction are supplied. Therefore, for catalyst carriers that are used for catalyst layers, a filling property low enough to secure appropriate voids in the catalyst layer and high electron conductivity are demanded. Furthermore, in order to reduce the costs of polymer electrolyte fuel cells, it is also demanded to reduce the production cost of such a catalyst carrier.

In contrast, when an electrode catalyst is produced using the mesoporous carbon according to one aspect of the present disclosure as a catalyst carrier, and a polymer electrolyte fuel cell is produced using this electrode catalyst as an air electrode catalyst, IV performance equivalent to or more favorable than IV performance of the related art can be obtained particularly in high-current density ranges. This is considered to be because, when mesoporous carbon in which a connecting structure is formed and the pore diameters, the pore capacity, and the linearity are optimized is used as a catalyst carrier, an air electrode catalyst layer having an appropriate thickness and an appropriate amount of voids is obtained, and this suppresses flooding. Furthermore, when the mesoporous carbon is thermally treated at a temperature of higher than 1500° C., the IV performance of fuel cells for which this mesoporous carbon has been used further improves. This is considered to be because the graphitization of the mesoporous carbon proceeds due to the thermal treatment at higher than 1500° C. and the electron conductivity of the mesoporous carbon improves.

Examples 1 to 4 and Comparative Examples 1 to 3

1. Production of Sample

1.1. Production of Mesoporous Silica

1.1.1. Examples 1 and 2 n-Hexadecyltrimethylammonium chloride ($C_{16}H_{33}N(CH_3)_3Cl$), which is a surfactant: 17 g and ethanol: 12 g were added to a 1.5 mass % hydrochloric acid aqueous solution: 540 g. This hydrochloric acid aqueous solution was heated to 70° C. (Example 1) or 40° C. (Example 2), and No. 1 sodium silicate ($SiO_2$ content: 30 mass %, $SiO_2/Na_2O=2.00$): 67 g was added thereto under stirring. The solution was held for 3 hours in this state to perform a condensation polymerization reaction.

The obtained solid product was once filtered, dispersed in ion-exchanged water: 1000 g, and stirred. These filtration, dispersion, and stirring were repeated 5 times to wash the solid product, and then the solid product was dried at 70° C. for 24 hours. Next, the dried solid product was then dispersed in 2N hydrochloric acid and heated in an autoclave at 130° C. for 3 days. The solid product after the autoclave treatment was filtered, washed, dried, and then fired at 550° C. for 6 hours in the presence of an air, thereby obtaining mesoporous silica.

1.1.2. Examples 3 and 4

Predetermined amounts of a surfactant and 1N sodium hydroxide were added to a mixed solvent containing predetermined amounts of water, methanol, and ethylene glycol (EG) to obtain a first solution. Separately, a predetermined amount of tetraethoxysilane (TEOS) was added to a mixed solvent containing predetermined amounts of methanol and EG to obtain a second solution. Table 1 shows the amounts of the solutions prepared.

TABLE 1

|  |  | Example 3 | Example 4 |
|---|---|---|---|
| First solution | Water (g) | 241.0 | 1690 |
|  | Methanol (g) | 61.0 | 430 |
|  | EG (g) | 61.0 | 420 |
|  | Surfactant (g) | 7.1 | 50 |
|  | 1N NaOH (g) | 6.8 | 45 |
| Second solution | TEOS (g) | 7.3 | 50 |
|  | Methanol (g) | 15.0 | 100 |
|  | EG (g) | 15.0 | 100 |

When the second solution was added to the first solution, the solution became white turbid after a while, and it was possible to confirm that particles could be synthesized. After stirring at room temperature for 8 hours, the solution was filtered, and the residue was re-dispersed in water. After additional filtering, the residue was dried in an oven at 45° C. The dried sample was dispersed in 2N sulfuric acid and then heated at 120° C. for 3 days in an autoclave. After the sample after the autoclave treatment was filtered and washed, the sample was fired at 550° C. for 6 hours to remove an organic component.

1.1.3. Comparative Example 1 n-Hexadecyltrimethylammonium chloride ($C_{16}H_{33}N(CH_3)_3Cl$), which is a surfactant: 51 g and ethanol: 36 g were added to a 1.5 mass % hydrochloric acid aqueous solution: 1600 g. This hydrochloric acid aqueous solution was heated to 40° C., and No. 1 sodium silicate ($SiO_2$ content: 30 mass %, $SiO_2/Na_2O$=2.00): 201 g was added thereto under stirring. The solution was held for 3 hours in this state to perform a condensation polymerization reaction.

The obtained solid product was once filtered, dispersed in ion-exchanged water: 2500 g, and stirred. These filtration, dispersion, and stirring were repeated 5 times to wash the solid product, and then the solid product was dried at 70° C. for 24 hours. Next, the dried solid product was then dispersed in 2N hydrochloric acid and heated in an autoclave at 140° C. for 3 days. The solid product after the autoclave treatment was filtered, washed, dried, and then fired at 550° C. for 6 hours in the presence of an air, thereby obtaining mesoporous silica.

1.2. Production of Carbon Carrier

1.2.1. Examples 1 to 4 and Comparative Example 1

Mesoporous silica was put into a PFA container, and furfuryl alcohol (FA) was added by an amount of the pore capacity to cause the furfuryl alcohol to penetrate into pores in the silica. The resultant was thermally treated at 150° C. for 18 hours to polymerize the FA. Furthermore, the FA was thermally treated at 500° C. for 6 hours in a nitrogen atmosphere to carbonize the FA. These steps were repeated twice, and then the FA was thermally treated at 900° C. for 6 hours in a nitrogen atmosphere to obtain a mesoporous silica and carbon complex. This complex was immersed in a 12% HF solution for 12 hours to dissolve a silica component. After the dissolution, filtration and washing were repeated, and the resultant was further dried at 45° C. to obtain mesoporous carbon. Furthermore, the dried mesoporous carbon was heated at 1800° C. for 1 hour (graphitization treatment).

1.2.2. Comparative Examples 2 and 3

Commercially available hollow (mesoporous) carbon (Comparative Example 2) or solid carbon (Comparative Example 3) was used as it was as a carbon carrier.

1.3. Manufacturing of Fuel Cell

Pt was supported by the carbon carrier obtained as described above. The amount of Pt supported was set to 40 mass %. An air electrode catalyst layer was produced using this. The basis weight of Pt on the air electrode side was set to 0.15 mg/cm². In addition, the I/C of the air electrode catalyst layer was set to 1.0. In addition, a fuel electrode catalyst layer was produced using commercially available platinum-supported carbon in which the amount of Pt supported was 30 mass %. The basis weight of Pt on the fuel electrode side was set to 0.1 mg/cm². In addition, the I/C of the fuel electrode catalyst layer was set to 0.75.

The air electrode catalyst layer and the fuel electrode side catalyst layer were transferred to both surfaces of an electrolyte membrane, respectively, to obtain an MEA. A fluorine-based solid polymer electrolyte membrane was used as the electrolyte membrane. The MEA was combined into a square cell for 1 cm². Furthermore, diffusion layers and current collectors were disposed on both sides of the MEA. Carbon paper (with a microporous layer) was used as the diffusion layer. A flow path-integrated gold-plated copper plate (flow paths: linear flow paths at pitches of 0.4 mm) was used as the current collector.

2. Testing Method

2.1. SEM Observation

SEM observation of the carbon carrier was performed. Furthermore, the linearity and the average particle diameter of the primary particles were measured using a SEM image.

2.2.2 Pore Capacity of Secondary Pores

The pore capacity (the capacity of pores having pore diameters within a range of 20 nm to 100 nm) of secondary pores in the carbon carrier was determined using a mercury intrusion method.

2.3. Output Point Voltage

The output point voltage (mV) under high humidification conditions (80% RH, cell temperature: 60° C.) was evaluated using the obtained fuel cell. As power generation conditions, the $H_2$ flow rate was set to 500 cc/min, the air flow rate was set to 1000 cc/min, and the back pressure was set to 1 kg/cm².

3. Result

3.1. SEM Observation

Figure 2A:
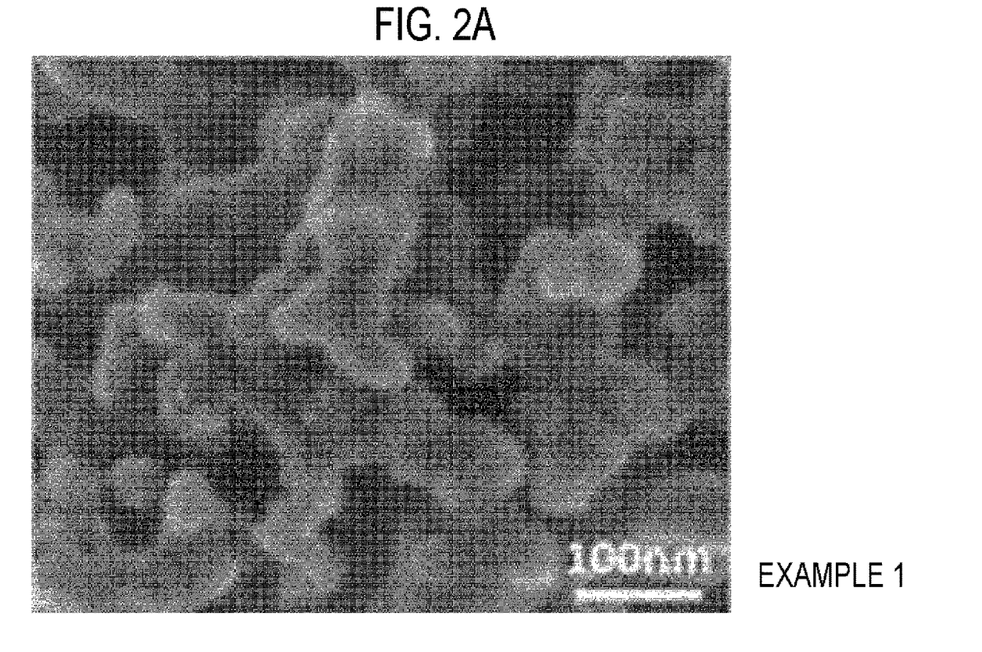
FIG. 2A is a SEM image of mesoporous carbon of Example 1.
Figure 2B:
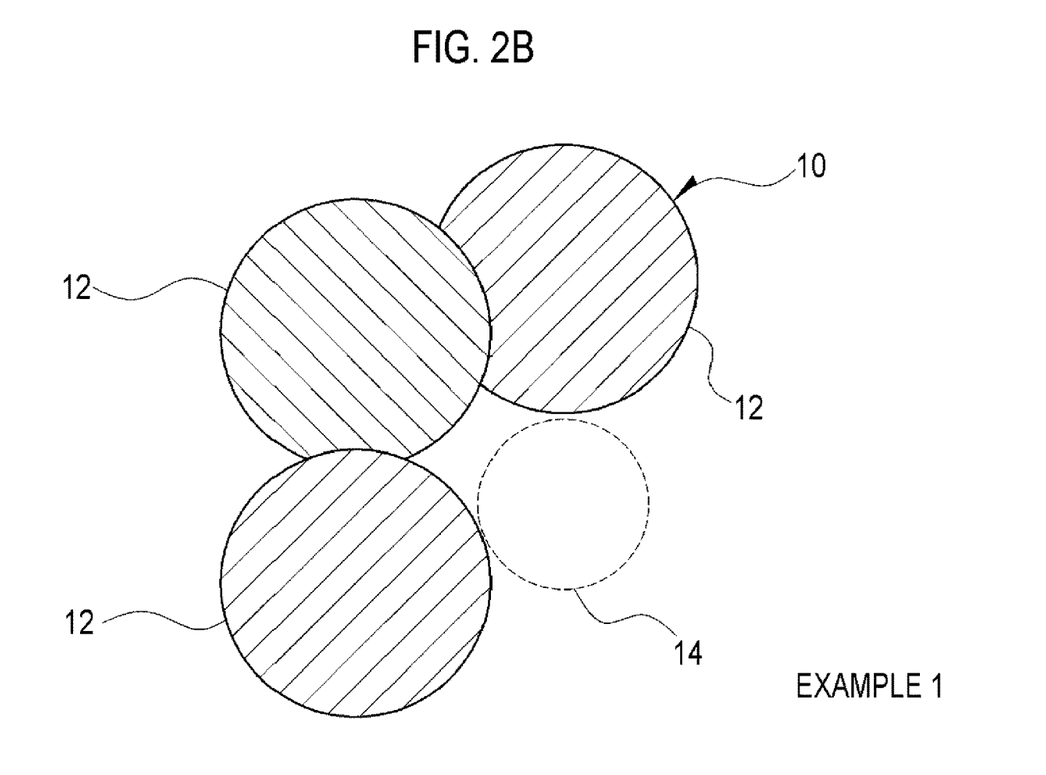
FIG. 2B is a schematic view of the mesoporous carbon of Example 1.
Figure 3A:
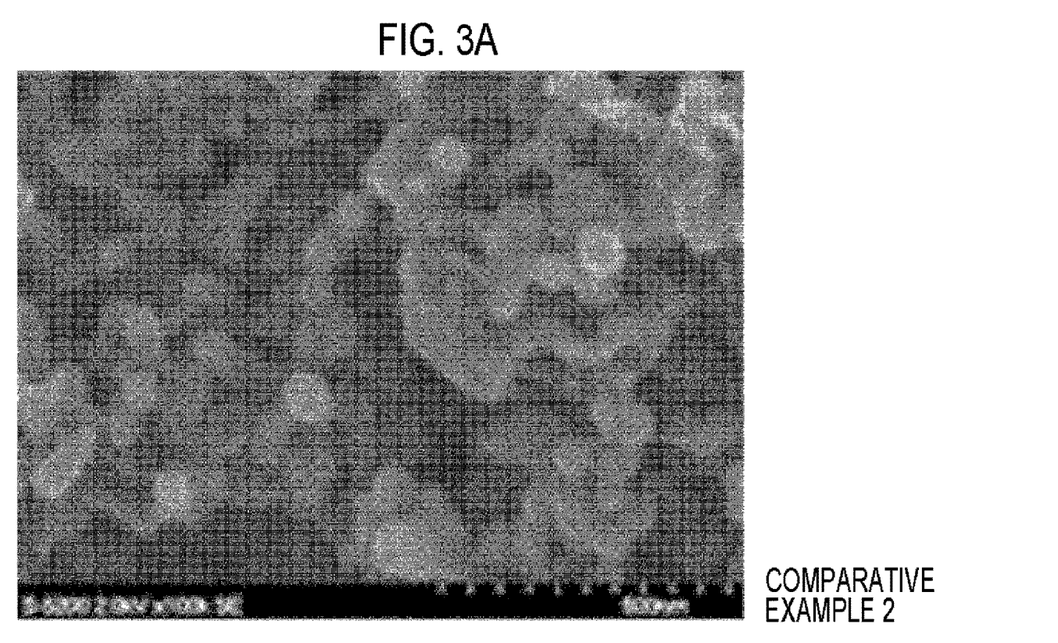
FIG. 3A is a SEM image of hollow carbon of Comparative Example 2.
Figure 3B:
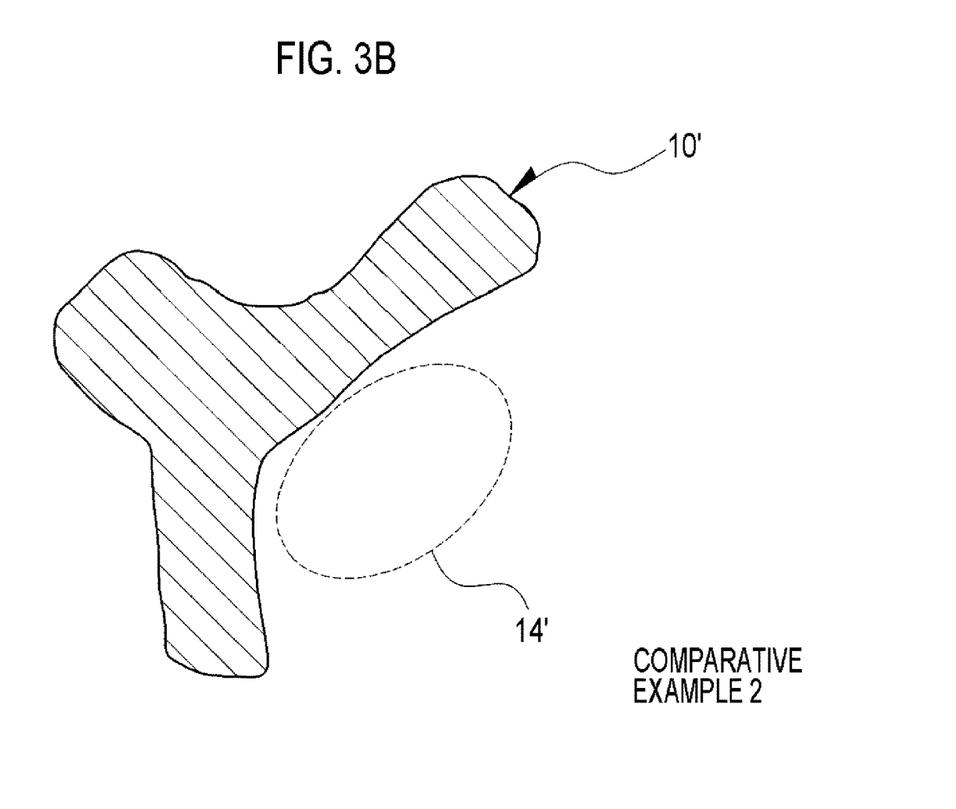
FIG. 3B is a schematic view of the hollow carbon of Comparative Example 2.

FIG. 2A and FIG. 2B show a SEM image and a schematic view of the mesoporous carbon of Example 1. FIG. 3A and FIG. 3B show a SEM image and a schematic view of the hollow carbon of Comparative Example 2. Hollow carbon 10' of Comparative Example 2 has a structure in which rod-shaped bodies made of carbon having mesopores (not shown) are branched in a tree shape. Therefore, the hollow carbon 10' of Comparative Example 2 had a large linearity and contained a relatively large amount of secondary pores 14'. In contrast, the mesoporous carbon 10 of Example 1 has a structure in which primary particles 12 having primary pores (not shown) are connected. Therefore, the mesoporous carbon 10 of Example 1 had a small linearity and a small pore capacity of the secondary pores 14 compared with the hollow carbon 10' of Comparative Example 2.

Figure 4A:
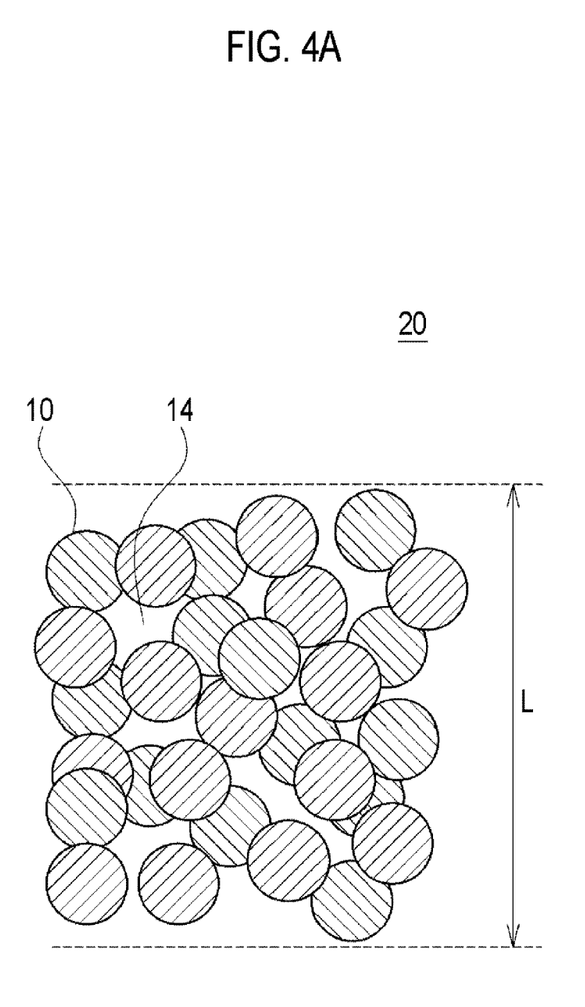
FIG. 4A is a schematic cross-sectional view of an air electrode catalyst layer of a fuel cell obtained in Example 1.
Figure 4B:
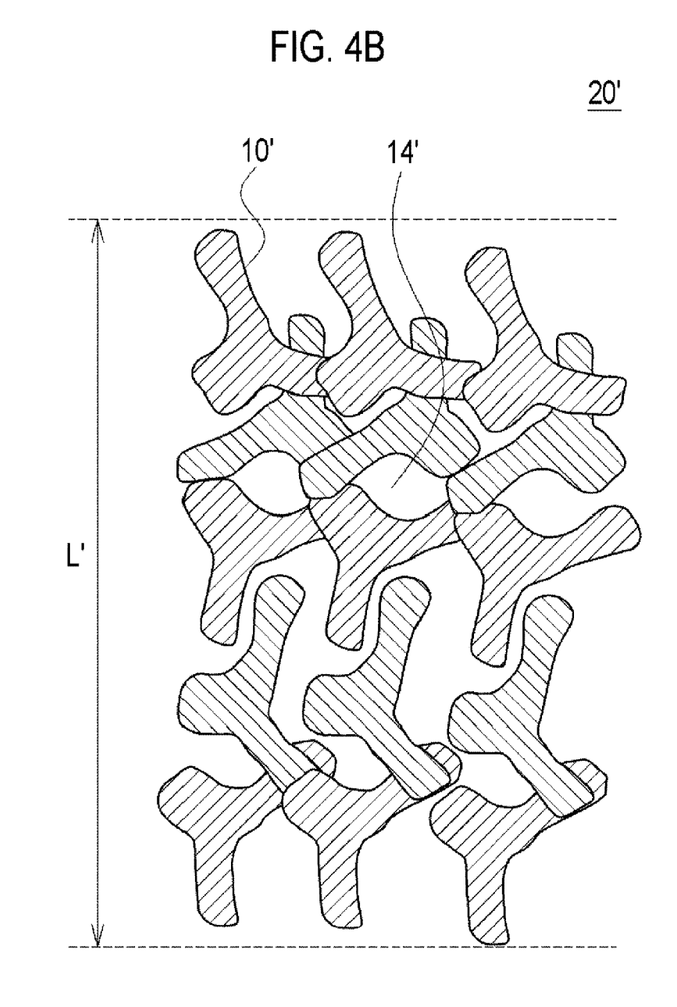
FIG. 4B is a schematic cross-sectional view of an air electrode catalyst layer of a fuel cell obtained in Comparative Example 2.

FIG. 4A shows a schematic cross-sectional view of the air electrode catalyst layer of the fuel cell obtained in Example 1. FIG. 4B shows a schematic cross-sectional view of the air electrode catalyst layer of the fuel cell obtained in Comparative Example 2. The hollow carbon 10' of Comparative Example 2 has an excessively large linearity and an excessively large pore capacity of the secondary pores 14'. Therefore, when a catalyst layer 20' is formed using the hollow carbon 10' of Comparative Example 2 such that the basis weight of Pt became a predetermined value, as shown in FIG. 4B, a thickness L' of the catalyst layer 20' became excessively thick. In contrast, the mesoporous carbon 10 of Example 1 has an appropriate linearity and an appropriate pore capacity of the secondary pores 14. Therefore, when a catalyst layer 20 is formed using the mesoporous carbon 10 of Example 1 such that the basis weight of Pt became a predetermined value, as shown in FIG. 4A, a thickness L of the catalyst layer 20 became appropriately thin.

3.2. Output Point Voltage

Table 2 shows the physical property values of the carbon carriers and the output point performance @ high humidification of the fuel cells produced using the carbon carriers.

TABLE 2

|  | Example 1 | Example 2 | Example 3 | Example 4 | Comparative Example 1 | Comparative Example 2 | Comparative Example 3 |
|---|---|---|---|---|---|---|---|
| Pore capacity of secondary pores* ($cm^3/g$) | 0.42 | 0.73 | 1.15 | 1.34 | 0.27 | 1.54 | 0.99 |
| Linearity | 2.3 | 2.2 | 2.4 | 2.2 | 2.1 | 2.7 | 1.4 |
| Average particle diameter of primary particles (nm) | 240 | 170 | 110 | 100 | 150 | — | — |
| Output point performance @ high humidification | 1.02 | 1.01 | 1.07 | 1.09 | 0.94 | 1 (reference) | 0.95 |

*Capacity of pores having pore diameters within a range of 20 nm to 100 nm

Figure 5:
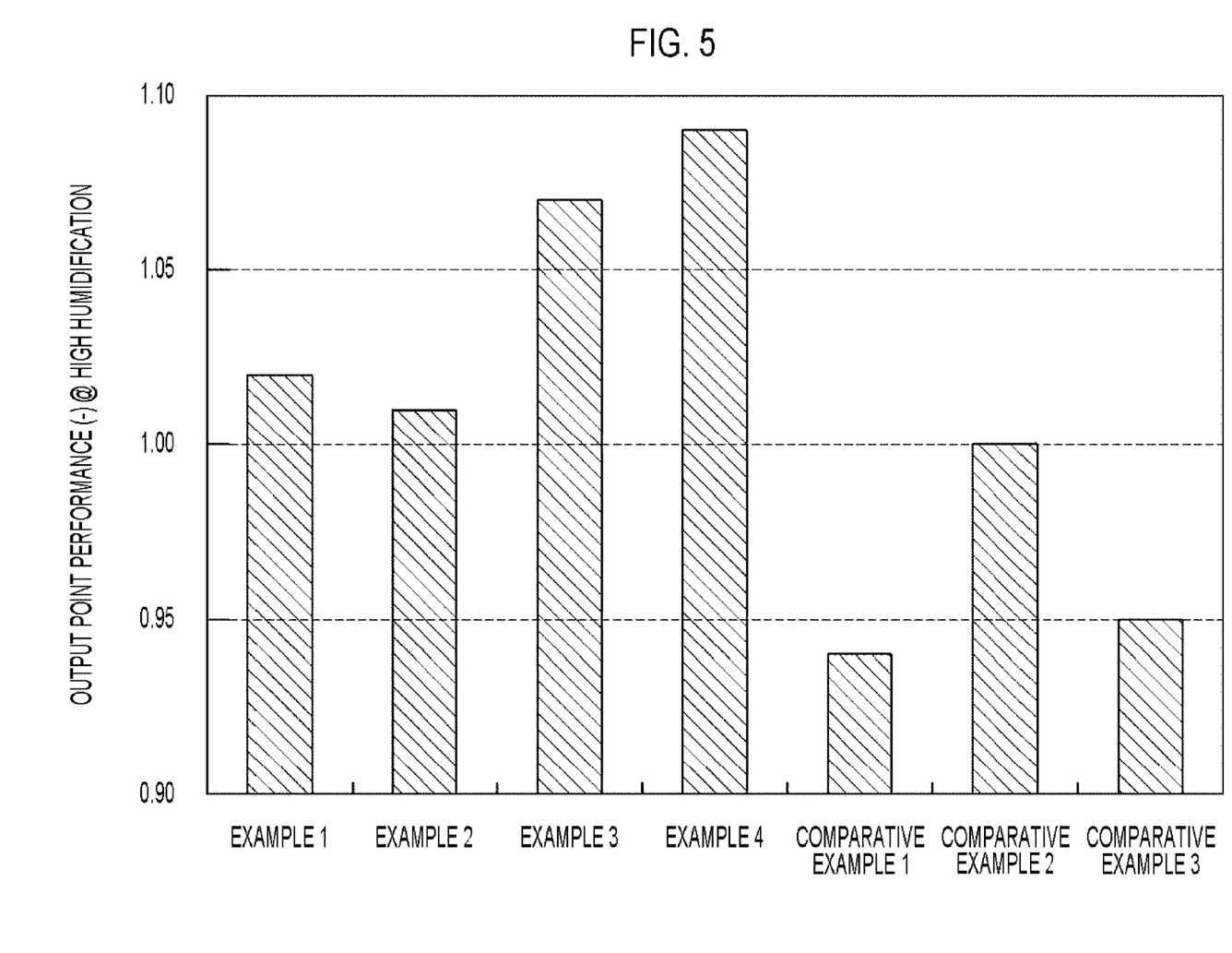
FIG. 5 shows output point performance @ high humidification of fuel cells obtained in Examples 1 to 4 and Comparative Examples 1 to 3.

In addition, FIG. 5 shows the output point performance @ high humidification of the fuel cells obtained in Examples 1 to 4 and Comparative Examples 1 to 3. In Table 2 and FIG. 5, "output point performance @ high humidification" refers to the ratio ($=V_1/V_0$) of the output voltage ($V_1$) of each fuel cell under the high humidification conditions to the output point voltage ($V_0$) of the fuel cell of Comparative Example 2 under the high humidification conditions. From Table 2 and FIG. 5, the following facts are found.

(1) The output point performance @ high humidification is lower in Comparative Example 1 than in Comparative Example 2. This is considered to be because the linearity of the carbon carrier was excessively small, and the pore capacity of the secondary pores was also small, which caused flooding under the high humidification conditions.

(2) The output point performance @ high humidification is lower in Comparative Example 3 than in Comparative Example 2. This is considered to be because the carbon carrier was solid carbon and the Pt catalyst was poisoned by an ionomer.

(3) The output point performance @ high humidification shown in Examples 1 and 2 was almost the same as that in Comparative Example 2. The output point performance @ high humidification in Examples 1 and 2 is poor compared with that in Examples 3 and 4. However, since a solvent containing water as a main component was used during the synthesis of the mesoporous silica in Examples 1 and 2, the costs were low compared with those in Examples 3 and 4 and Comparative Example 2.

(4) The output point performance @ high humidification shown in Examples 3 and 4 was higher than that in Comparative Example 2. This is considered to be because the linearity was appropriately small, the thickness L of the catalyst layer became appropriately thin, and the proton resistance of the catalyst layer decreased. In addition, it is considered that the pore capacity of the secondary pores was relatively large and flooding was suppressed under the high humidification conditions.

Hitherto, the embodiment of the present disclosure has been described in detail, but the present disclosure is not limited to the above-described embodiment by any means and can be modified in a variety of manners within the scope of the summary of the present disclosure.

The mesoporous carbon according to one aspect of the present disclosure can be used as a catalyst carrier for an air electrode catalyst layer of a polymer electrolyte fuel cell or as a catalyst carrier for a fuel electrode catalyst layer.

What is claimed is:

1. Mesoporous carbon comprising primary particles, wherein
   the mesoporous carbon has a connecting structure in which the primary particles are connected,
   the primary particles are made of carbon particles having primary pores with a primary pore diameter of less than 20 nm,
   a secondary pore diameter of secondary pores of the mesoporous carbon is in a range of 20 nm to 100 nm,
   a pore capacity of the secondary pores is 0.42 $cm^3/g$ or more and 1.34 $cm^3/g$ or less, the pore capacity being measured by a mercury intrusion method, and
   the mesoporous carbon has a distorted shape and a linearity of 2.2 or more and 2.6 or less.

2. The mesoporous carbon according to claim 1, wherein an average particle diameter of the primary particles is 30 nm or more and 300 nm or less.

3. The mesoporous carbon according to claim 1, wherein the pore capacity of the secondary pores is 0.42 $cm^3/g$ or more and 1.00 $cm^3/g$ or less.

4. An electrode catalyst for a fuel cell comprising:
the mesoporous carbon according to claim 1; and
catalyst particles supported in the primary pores of the mesoporous carbon.

5. A catalyst layer comprising:
the electrode catalyst for the fuel cell according to claim 4; and
a catalyst layer ionomer.

6. The catalyst layer according to claim 5, wherein the catalyst layer is an air electrode catalyst layer of the fuel cell.

7. A fuel cell comprising the catalyst layer according to claim 5.

* * * * *